Patented Jan. 25, 1949

2,460,068

UNITED STATES PATENT OFFICE 2,460,068

COBALT BROMIDE RELATIVE HUMIDITY INDICATORS

Paul Bell Davis, Baltimore, Md., assignor to The Davison Chemical Corporation, Baltimore, Md.

No Drawing. Application February 7, 1945, Serial No. 576,719

8 Claims. (Cl. 252—408)

This invention relates to indicators and more particularly has reference to compositions for indicating the presence and quantity of moisture in a gaseous atmosphere.

An object of this invention is to provide a composition for indicating the presence and quantity of moisture in a gaseous atmosphere within predetermined limits.

Another object of this invention is to provide a composition capable of exhibiting a definite color break when exposed to a gaseous atmosphere having a relative humidity ranging from about 0 to 10%.

Yet another object of this invention is to provide a composition capable of exhibiting a definite color break when exposed to a gaseous atmosphere having a relative humidity ranging from about 10 to 20%.

The present invention also has as an object the provision of a composition capable of exhibiting a definite color break when exposed to a gaseous atmosphere having a relative humidity ranging from about 20 to 40%.

A further object of this invention is to provide a moisture indicator formed of an adsorbent material such as silica gel having cobalt bromide incorporated in the pores thereof in which the adsorbent characteristics of the adsorbent material, its moisture content, the color changing characteristics of the $CoBr_2$ and its concentration are correlated to produce a definite break in the color of the indicator when exposed to a gaseous atmosphere having a predetermined relative humidity.

It is also an object of this invention to provide a method of making a color changing moisture indicator.

Further objects will appear hereinafter in the description of the invention.

In accordance with the present invention it has been found that by treating an adsorbent carrier such as silica gel with an aqueous solution of $CoBr_2$ and drying the so treated carrier, an indicator gel is obtained which has a definite color and which upon exposure to a gaseous atmosphere such as air having a predetermined relative humidity will change its color.

It has been found in accordance with the present invention that by correlating the adsorptive characteristics of the carrier, its final moisture content as fixed by the temperatures at which the impregnated carrier is dried, or dried and activated, and the concentration of the cobalt bromide in the carrier, the color of the resulting indicator before exposure to a humid atmosphere and also the color of the indicator after exposure to an atmosphere having a predetermined relative humidity can be adjusted or controlled.

The present invention is directed principally to moisture indicators formed of a carrier such as silica gel impregnated with cobalt bromide and having a definite color change or break when exposed to a gaseous atmosphere such as air having a relative humidity in the ranges of 0 to 10%, 10 to 20% and 20 to 40%.

In preparing an indicator according to the present invention, a standard silica gel made by washing an acid reacting hydrogel with an acidic wash water at a temperature of about 150° F., drying and then activating at a temperature of about 850° F. and sized to about 6 to 16 mesh was employed. The silica gel in the activated form was first treated by exposing it to a humid atmosphere having a high relative humidity to saturate the gel with moisture to such an extent that upon contacting it with a liquid it would not disintegrate as is the case when freshly activated gel is contacted with a liquid.

After saturation with moisture to an approximate total volatile content of about 30% the gel was impregnated with an aqueous solution of cobalt bromide. It has been found that by first saturating the gel with moisture to the extent indicated, wetting of the gel with cobalt bromide solution can be effected by using 50 ml. of solution per kilogram of gel. Of course if necessary more of the solution can be employed. The cobalt bromide solution used was of such concentration and the quantity of solution per kilogram was such that the gel had a $CoBr_2$ content ranging from 2 to 3% on a dry basis.

When the gel having a $CoBr_2$ content of about 2% was heated to a temperature of about 200° F. to effect drying thereof a product was obtained which had a Munsell color value of about 10.0 Gy 3/4. This indicator gel was found to be particularly suitable for the indication of the presence of moisture in a gaseous atmosphere having a relative humidity ranging between 0 and 10%. For instance, when this indicator gel was exposed to an atmosphere having a relative humidity of about 10% the color of the gel changed to 5.0 YR 7/8 M. C. V. When this same indicator gel was exposed to an atmosphere having a relative humidity of about 20% the color changed to about 2.5 YR 7/6 M. C. V.

By varying the temperature at which the gel having a $CoBr_2$ content of about 2% was heated for drying, an indicator gel was obtained having a definite color break when exposed to an atmosphere having a relative humidity of about 20 to 40%. For instance by drying the gel impregnated with $CoBr_2$ to an extent of about 2% at a temperature of about 250° F. a product was obtained having a color of about 7.5 YR 3/2 M. C. V. Upon exposing this indicator to an atmosphere having a relative humidity of about 20% the color changed to 2.5 GY 6/4 M. C. V. The same gel when exposed to an atmosphere having a relative humidity of about 40% changed its color to about 7.5 G 7/6 M. C. V.

By changing the concentration of the $CoBr_2$ in the gel a change in the color break was obtained. For instance by impregnating silica gel with $CoBr_2$ to a content of about 3% and drying the same at a temperature of about 200° F. an indicator gel was obtained which exhibited a color break when exposed to an atmosphere having a relative humidity ranging between 10 to 20%. This product had a color of about 2.5 G 3/4 M. C. V. and when exposed to an atmosphere having a relative humidity of about 10% changed its color to about 10.0 YR 5/8 M. C. V. This same product when exposed to an atmosphere having a relative humidity of about 20% changed its color to about 2.5 YR 5/10 M. C. V.

In the drying and activating of the above mentioned gels the same were held at the temperature mentioned for about three hours.

While silica gel has been described as the carrier of cobalt bromide, a porous glass may be used as described in my co-pending application, Serial No. 576,726 (now abandoned), filed of even date herewith.

Such porous glass is made from a glass containing from 60 to 82% $SiO_2$, 20 to 35% $B_2O_3$ and 5 to 10% alkali oxide heat treated at a temperature of 525 or 600° C. to cause the glass to be separated into two phases, one of which is rich in boric oxide and alkali oxide and is soluble in acids, and the other of which is very rich in silica and substantially insoluble in acids. By treating the so heat treated glass with an acid such as hydrochloride, nitric or sulphuric acids maintained at a temperature at or near the boiling point thereof, the acid reacts with the alkaline phase of the glass forming a number of microscopic pores throughout the body thereof. This porous glass may be used in place of the silica gel hereinbefore mentioned.

The values given for the various colors in the foregoing description refer to the system of color notation devised by A. H. Munsell and published by Munsell Color Company, Inc., Baltimore, Maryland, as the Munsell Book of Color, abridged edition, revised 1942.

From the foregoing description it will be appreciated that the present invention provides an indicator gel particularly suitable for the indication of the relative humidity of an atmosphere. It will also be appreciated that the present invention provides methods of preparing and utilizing indicator gels having color breaks when exposed to atmospheres of different relative humidities.

I claim:

1. A method of preparing a quantitative relative humidity indicator comprising impregnating activated adsorbent silica gel with about 2-3% of cobalt bromide, and heat treating the impregnated gel, at a temperature of 200-250° F., said indicator changing color when exposed to an atmosphere having a relative humidity of 0-40%.

2. A quantitative relative humidity indicator adapted to change color when exposed to an atmosphere having a predetermined humidity consisting essentially of silica gel impregnated with cobalt bromide, said indicator having been prepared by the process of claim 1.

3. A method of preparing a quantitative relative humidity indicator comprising impregnating activated silica gel with about 2%, on a dry basis, of cobalt bromide, and drying the impregnated silica gel at a temperature of about 200° F., said indicator changing color when exposed to an atmosphere having a relative humidity of 0-10%.

4. A quantitative relative humidity indicator consisting essentially of silica gel impregnated with about 2%, on a dry basis, of cobalt bromide, said indicator changing color when exposed to an atmosphere having a relative humidity ranging from zero to 10% and being prepared by the method of claim 3.

5. A method of preparing a quantitative relative humidity indicator comprising impregnating activated silica gel with about 2%, on a dry basis, of cobalt bromide, and drying the impregnated silica gel at a temperature of about 250° F., said indicator changing color when exposed to an atmosphere having a relative humidity of 10-20%.

6. A quantitative relative humidity indicator consisting essentially of silica gel impregnated with about 2%, on a dry basis, of cobalt bromide, said indicator changing color when exposed to an atmosphere having a relative humidity ranging from 20-40% and being prepared by the method of claim 5.

7. A method of preparing a quantitative relative humidity indicator comprising impregnating activated silica gel with about 3%, on a dry basis, of cobalt bromide, and drying the impregnated silica gel at a temperature of about 200° F., said indicator changing color when exposed to an atmosphere having a relative humidity of 10-20%.

8. A quantitative relative humidity indicator consisting essentially of silica gel impregnated with about 3%, on a dry basis, of cobalt bromide, said indicator changing color when exposed to an atmosphere having a relative humidity ranging from 10-20% and being prepared by the method of claim 7.

PAUL BELL DAVIS.

REFERENCES CITED

The following references are of record in the file of this patent:

UNITED STATES PATENTS

| Number | Name | Date |
| --- | --- | --- |
| 1,947,381 | Connolly et al. | Feb. 13, 1934 |
| 1,176,875 | Connolly et al. | Oct. 16, 1934 |
| 2,210,862 | Tronstad | Aug. 6, 1940 |
| 2,214,354 | Snelling | Sept. 10, 1940 |

FOREIGN PATENTS

| Number | Country | Date |
| --- | --- | --- |
| 280,934 | Great Britain | Feb. 18, 1929 |
| 345,672 | Great Britain | Mar. 23, 1931 |
| 393,094 | Great Britain | June 1, 1933 |
| 437,139 | Great Britain | Oct. 24, 1935 |

OTHER REFERENCES

The Chemical Trade Journal and Chemical Engineer, July 14, 1939, page 31.

Certificate of Correction

Patent No. 2,460,068.                                            January 25, 1949.

PAUL BELL DAVIS

It is hereby certified that error appears in the printed specification of the above numbered patent requiring correction as follows:

Column 4, line 27, claim 5, for "10–20%" read *20–40%*;

and that the said Letters Patent should be read with this correction therein that the same may conform to the record of the case in the Patent Office.

Signed and sealed this 7th day of June, A. D. 1949.

[SEAL]

THOMAS F. MURPHY,
*Assistant Commissioner of Patents.*